United States Patent [19]
Willinsky et al.

[11] Patent Number: 5,713,303
[45] Date of Patent: Feb. 3, 1998

[54] IN SITU FISH INCUBATOR

[76] Inventors: Michael D. Willinsky, 2269 Constance Dr., Oakville, Ontario, Canada, L6J 5L8; John E. Huguenin, 49 Oyster Pond Rd., Falmouth, Mass. 02540

[21] Appl. No.: 420,978

[22] Filed: Apr. 11, 1995

[30] Foreign Application Priority Data

Apr. 11, 1994 [CA] Canada ................................ 2120969

[51] Int. Cl.⁶ .................................................. A01K 61/00
[52] U.S. Cl. ............................ 119/218; 119/230; 119/223
[58] Field of Search ................................. 119/217, 218, 119/223, 230, 208, 232, 233, 239

[56] References Cited

U.S. PATENT DOCUMENTS

| | | | |
|---|---|---|---|
| 3,653,358 | 4/1972 | Fremont | 119/223 |
| 4,379,437 | 4/1983 | Knowles | 119/230 |
| 4,380,213 | 4/1983 | Blair et al. | 119/223 |
| 4,909,186 | 3/1990 | Nakamune et al. | 119/223 |
| 4,930,444 | 6/1990 | Vasile | 119/223 |
| 5,193,481 | 3/1993 | Loverich et al. | 119/223 |
| 5,299,530 | 4/1994 | Mukadam et al. | 119/223 |
| 5,359,962 | 11/1994 | Loverich | 119/223 |

*Primary Examiner*—Robert P. Swiatek
*Assistant Examiner*—Elizabeth Shaw

[57] ABSTRACT

A fish-cage incubator has a light source for attracting zooplankton therein a mesh barrier that admits zooplankton and excludes predators of fish larvae.

20 Claims, 4 Drawing Sheets

IN SITU FISH INCUBATOR

FIELD OF THE INVENTION

This invention relates to an apparatus and method for cultivating fish larvae in incubation cages installed in open water. In particular, it relates to a means of attracting zooplankton as food for fish larvae contained within such incubator, positioned within a body of water such as the sea, inland lakes and other aquatic environments.

BACKGROUND TO THE INVENTION

The use of night-time surface and sub-surface light to attract and concentrate marine life, particulary fish and squid, has been practiced by man for centuries. The phenomena of light attraction for small marine life forms, while previously observed, began to be researched in earnest during World War II, due to its importance in submarine and antisubmarine warfare.

The smaller forms of marine life include small marine animals (zooplankton) with limited swimming ability most of which are not observable without optical assistance, and somewhat larger animals (nekton), which have stronger swimming ability and are normally visible with the unaided eye. When these organisms concentrate, they can seriously impede sonar definition and hence the usefulness of underwater military acoustic systems. As a consequence, starting during WW II and extending to the present time, much research effort has been devoted to analyzing their behaviour and their effects on marine acoustics.

The research that has been done on the phototropic and phototactic response of marine zooplankton and small fish has been mainly addressed toward acquiring a better understanding of marine acoustics for military applications, and to a lesser extent to obtain a greater understanding of the ecology and food chain dynamics of the sea. This work concentrated on the study of the structure, composition and ecology of the deep scattering layers in open ocean and how zooplankton are influenced by ambient light characteristics. More recently, military funded research on the attraction to and repulsion from light of small marine animals, including intensities, spectral properties, seasonal effects and species compositions, is believed to have been carried out. This data is not generally in the public domain, and it's quantity, quality and specificity is unknown.

At the November, 1993 International Conference on Environmental Management of Enclosed Coastal Seas, Baltimore, MD, a poster display depicted larval fish being raised in fresh water without supplemental feeding within an illuminated net cage. At this poster session discussions were directed to prior experiments involving the attraction of zooplankton by underwater illumination to serve as a source of food for feeding larval and freshwater fish. No quantitative variables of this process were defined: e.g. no assessment of the effects of net aperture, light frequency or light intensity were presented at this session. Further, the problems of excluding predators were not addressed.

The inventors herein have proceeded to quantify the phototactic effect and use it as it relates to marine zooplankton for feeding larval marine fish. Two prototype fine mesh illuminated larval fish incubators containing very young cod fish have been installed in seawater and instrumented with a high resolution microscopic video camera. A seasonal cod larvae predator in seawater, the arrow or glass worm, "Chaetognatha", (a zooplankton with a size of about 3 mm, not much bigger than the fish larvae) has been found to complicate the screen mesh selection. It is against this background that the invention herein has been made.

The invention hereafter described has as one of its objects the provision of means by which the attraction of zooplankton to provide food for fish larvae may be effected utilizing cages of a character which are specifically suited to excluding predators whilst retaining larval fish, and allowing entry of small marine organisms to serve as food for the brood stock.

U.S. Pat. No. 4,094,270 is directed to a cage for hatching fish wherein newly hatched fry can migrate through slots in a shelf to a lower fry-rearing chamber where they are protected from predators. However, arrangements to induce food sized organisms to enter the chamber are not addressed.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

This invention in its broader aspects is based on the use of the phototactic response (response to light) of marine zooplankton and small nekton to draw these marine organisms into a fish-cage incubator through a fine mesh of selected gauge and produce an elevated concentration of such zooplankton within the cage. At the same time, the mesh is sized to exclude predators That are a threat to the fish fry or larvae being cultivated. This invention is particularly suited to raising tropical, temperate and boreal fish species.

The light source is preferably of such an intensity and spectral character as to maximize the concentration of zooplankton within the incubator. Once concentrated, these marine organisms can be used as the sole food source for larval and post larval marine fish, and eventually as a supplemental feed for juvenile marine fish. This latter benefit is particularly valuable during the transition to solid food, an area of nutrition not well understood for many marine fish.

A light source having a substantial blue-green to yellow component, has been found to be particularly effective in attracting zooplankton.

A net aperture selection based on apertures distributed in 1.0×1.5 mm center-to-center array, the holes being marginally smaller, has also been found appropriate for excluding chaetognatha from attacking the larval fish. Larval cod fish are typically 1.1 to 1.5 mm in size and can be introduced into the incubator immediately upon birth or after some additional growth.

At later stages in the development of the fish, zooplankton and small nekton in length up to several cm will be required to feed the fingerling and juvenile marine fish. This stage can be accommodated by changing the netting to a larger mesh size to allow the migration of somewhat larger organisms into the illuminated in situ incubator. By this stage of development the young fish are large enough that the predator chaetognatha and others are no longer a threat.

The incubator of the invention is a supported cage having at least a portion of the cage walls in the form of a perforated barrier. The perforated barrier provided is of a size and is positioned to permit the cross-flow of water through the incubator interior arising from natural currents. The cage walls need not, therefore, be entirely composed of a porous mesh or barrier.

Preferably, if exposed directly to currents the porous surface portion of the walls of the cage should be sufficient to ensure that excessive, unnecessary drag does not arise from the pressure of natural currents and wave circulation. For strength, to resist such pressures, the barrier may be composite, with a fine, weaker mesh bonded to or contained by a coarser more sturdy net. As an alternative to directly exposing the cage to water currents, baffles, deflectors or other current-screening devices may be employed. Where currents are significant, such devices are highly desirable to shield fragile fry and larval fish from stressful water velocities.

Current screening devices may include shrouds or baffles located either upstream or downstream of the cage, relative to the current. An upstream shroud, preferably streamlined to reduce drag, can be automatically oriented towards the current about a swivelling axle by a trailing vane. A downstream nacelle supported by an axle located at its upstream end will automatically self-align with the current.

Such current screening devices may have openings to reduce drag and permit some flow of water through the cage. The size of such openings may be selected to provide a positive but tranquil flow within the cage, carrying zooplankton into the zone of attractive illumination.

The incubator cage of the invention is preferably supported within a space-frame or exoskeleton that will ensure that, even with flexible walls, the cage will maintain its volume. This is to prevent the over concentration of larval fish which would occur if the netted volume was reduced by the collapse of the net walls and to ensure that such larvae are not forced into a portion of the light field that is excessively intense. The space frame is also intended to support the perforated barrier tautly, in a manner that will permit such barrier to be regularly cleaned to remove algae and other detritus. As cleaning may be effected by brushing or by application of a hydraulic jet, the barrier should be stabilized against the forces arising in the course of such processes.

The light source of the invention may be placed within the interior of the incubator, but need not necessarily be so positioned. Thus, lights may be located outside of the cage, with their field of illumination passing into the interior of the incubator and being visible to zooplankton beyond its outer walls. Conveniently, a non-perforated portion of the cage walls may be provided with windows to permit the light to enter the incubator. Multiple lights may be provided, both within and outside the cage volume, with overlapping fields of illumination. Such arrangements can reduce the presence of zones of excessively intense illumination within the cage. A 60 watt light powered by a 12 volt supply has been found sufficient to illuminate a 1 cubic meter cage. Band pass and neutral density filters may be used to limit the light to the preferred spectral range. Such filters can permit selected frequencies of light, by exclusion of others, of light sources to be utilized.

The apertures in the porous barrier will need regular cleaning to remove adhering life forms and deposited suspended matter. The interval for cleaning will vary with water temperature and the degree of algae, etc. present in the water. This interval may range from daily to weekly.

The means for cleaning the porous barrier surface may include simple mechanical brushing, or washing with a hydraulic jet. Both of these operations can be carried-out mechanically or by hand, under water, but they are preferably effected by raising the incubator cage to the surface with the top portion of the barrier exposed in the air for cleaning. For this exercise, it is convenient to employ a rotatable space frame of the type already known for standard fish cages.

The composition of the concentrated zooplankton and small nekton within the net mesh incubator can be controlled by light frequency and light intensity as well as by selection of mesh size. Preliminary indications are that the phototactic response of marine zooplankton and small nekton is maximized in a spectral region centered on green (about wavelengths of 0.50–0.55 microns). Copepods manifest their greatest attraction around 0.48 microns. In this region of the spectrum the extinction co-efficient for coastal waters is minimized. The phototactic response extends beyond green to blue (about 0.45 microns) and yellow (about 0.67 microns).

There is a wide range of light intensities which either attract or repel zooplankton. Copepods which migrate diurnally (i.e., most late-stage copepodites and adult copepods) tend to become positively geotactic (descending to greater depths) at intensities around $1.3 \times 10^{-5}$ $Wm^{-2}$ (watts per $meter^{-2}$) and move to the surface around $3 \times 10^{-8}$ $Wm^{-2}$. Younger stages (nauplii and early copepodites) are positively phototactic at intensities up to $5 \times 10^{-8}$ $Wm^{-2}$ or sunlight on a bright day. In general, the lights in the cages should be designed to attract younger stages of crustaceans while repelling older stages during the initial period of larval incubation.

There are strong indications that the zooplankton and small nekton organisms associated with the lower levels of diurnal migration respond better to the green and lower light intensities, while those organisms associated with higher levels of diurnal migration favour red and yellow and somewhat higher light intensities. Species, size, sex and season can also be important factors in the behavioral response of zooplankton and small nekton. The control variables (light frequency, intensity and mesh size) are preferably adjusted as the cultured fish grow to meet their changing dietary requirements.

For a number of practical reasons, as the cultured fish grow, the young fish are customarily transitioned to prepared pelleted feeds. Maintaining high concentrations of zooplankton and small nekton attracted by light, even if eaten as a small fraction of the culture fish's food intake, will substantially reduce the risks associated with failing to maintain the nutritional requirements of the juvenile fish, particularly during this transition and thereafter. This is particularly true with respect to zooplankton and small nekton-consuming cultured fish species about which little is known.

Each fish species has somewhat different nutritional needs. For many species, uncertainties in the nutritional requirements of first swimming fingerlings, juveniles and adults are currently the major limiting factor in being able to culture these fish to market size in a cost effective fashion. The "incubator" will assist the culturing of demersal (bottom feeding) and pelagic (water column feeding) fish during their early development stages at low cost. This development has the potential to greatly expand the efficiency of release of young fish for restocking or to allow cost effective farmed production of the species by providing large numbers of low cost fingerlings.

Since many marine fish of commercial importance are dependent on zooplankton during their early life stage, this invention has broad species applicability for both pelagic and demersal fish species. It is applicable to tropical, temperate and boreal fish species and extends to both eggbearing and live-birth classes of fish. This invention obviates the need for the expensive and scale-limited shore based nursery rearing of larval fish. It can be readily scaled up for large scale production of fingerlings production without the need for any supplemental feeding. Even scaled up, such a system is relatively small, light-weight, easily transported and readily deployed.

The fingerlings produced in the incubator can be released to grow-out in the wild or be cultured to market size. Brood stock maintenance and hatching of fish eggs still require shore based facilities. The lack of a sufficient number of low cost fingerlings is the current limiting factor in many types of marine fish aquaculture. This invention addresses that need.

The in situ incubator of the invention is also far less labour intensive than the tank rearing of newly hatched marine fish species, and is therefore less costly. In addition, the capital cost of an in situ marine incubator system is only a small fraction of the cost of an equivalent shore based hatchery facility.

Critical factors that determine the survival of young marine fish are known to be: (1) proper environment, (2) adequate food supply, (3) protection from predators. This invention solves all three critical problems. The proper environment is assured by correctly locating the incubator in the correct place, at the optimum depth within the marine environment. Adequate food supply (adequate zooplankton concentrations) is established by exploitation of the natural availability of this food source, and their phototactic response. Protection from predators is achieved by careful selection of mesh size. Larval and early post larval marine fish, depending on fish species, location and season, may have predators within the zooplankton community, who may not be much bigger than the young fish. The initial mesh size will vary according to fish species being cultured, location and zooplankton predator sizes. Net mesh size should be selected to be as large as possible to still be able to contain the fish, allow entry of zooplankton and exclude all the predators. Mesh size can be increased as the fish grow to allow larger zooplankton and small nekton to pass through the mesh.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
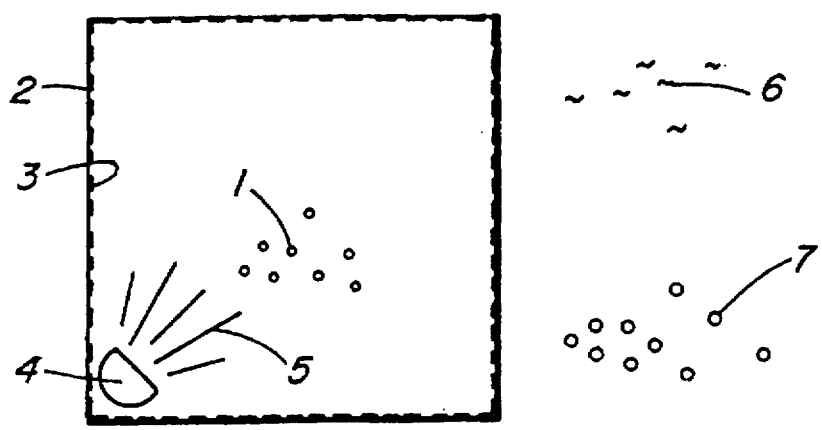
FIG. 1 is a schematic depiction of fish larvae in a fish-cage incubator, separated from the surrounding water by a meshed barrier according to the invention.

In FIG. 1 fish larvae 1 are located in the interior of a fish cage 2 separated from the outside on at least a portion of the sides of the cage by a fine meshed barrier 3. Inside the cage 2 is a light source 4 for attracting zooplankton that preferably emits light 5 in the green range of the spectrum.

Outside the cage are wild zooplankton 6 and predators 7. The zooplankton 6 are of a smaller size than the predators 7.

The barrier 3 is porous, having openings that are intermediate in size between the size of the zooplankton 6 and the predators but smaller than the size of the fish larvae to be contained. A typical pore size that will exclude chaetognatha is in the range of 0.5 to 2.5 mm in diameter preferably being between 1.5 and 2.0 mm.

Figure 2:
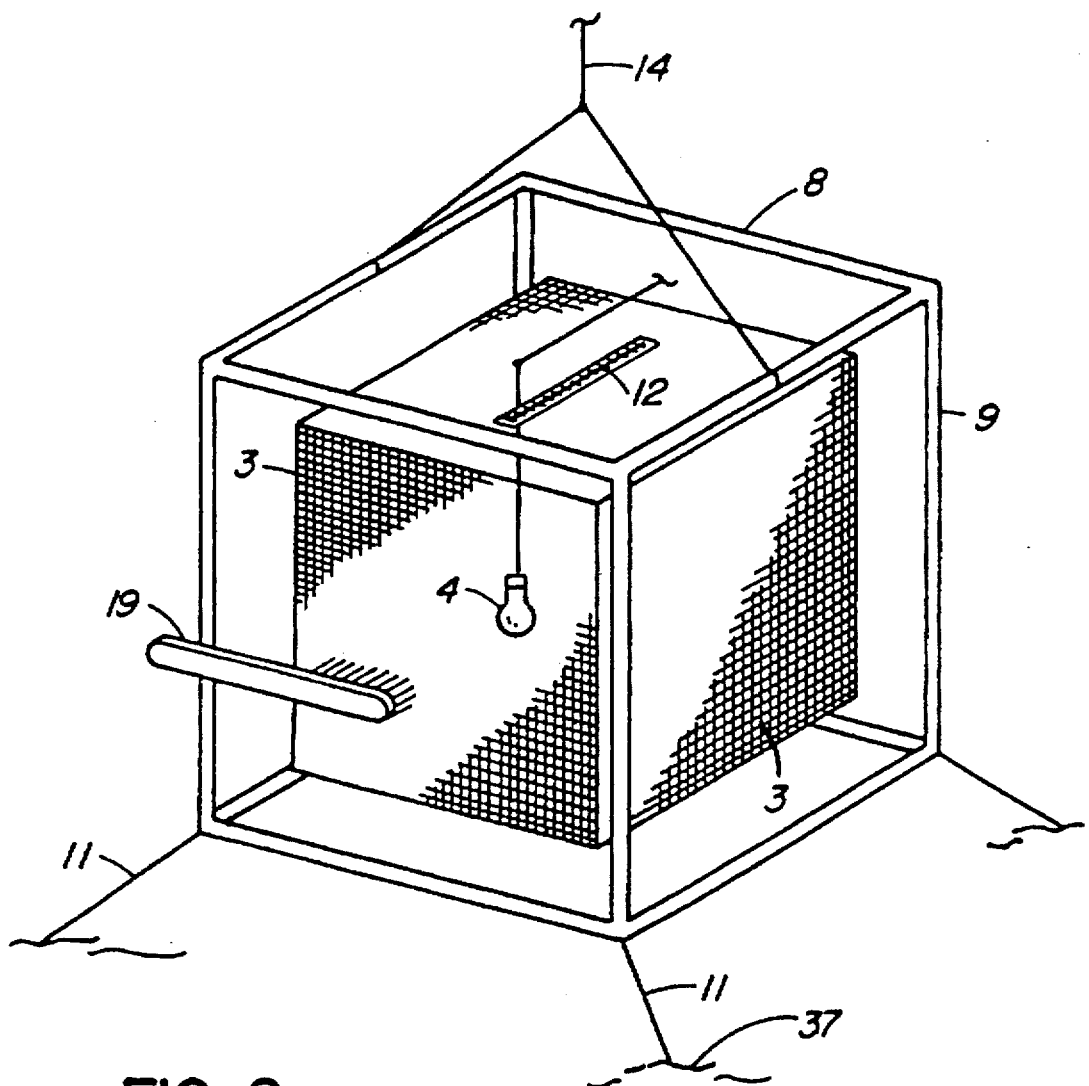
FIG. 2 is an isometric view of a cubic fish-cage incorporating the barrier of FIG. 1.

In FIG. 2 the barrier 3 is strung inside a cage frame 8 of aluminum or galvanized steel rods 9 which serve as structural members. A light bulb 4 within the enclosing barrier 3 serves as the light source 4. Mooring lines 11 locate the cage frame 8 at a preferred depth below the surface, the cage 2 optionally having positive buoyancy. A lifting cable 14 permits it to be raised if it lacks such buoyancy. The depth of mooring may vary with the site location, surface and subsurface temperatures and season of the year. For protection from storm waves, boat traffic and some fishing operations, the cage may be sunk to the ocean floor 37.

An access zippered opening 12 in the top of one of the walls of the cage 2 can be opened to introduce fish larvae 1, and closed as by use of a zippered closure to render the barrier 3 integral.

The barrier 3 may be cleaned several times a week by brushing the surface of the barrier 3. This may be done underwater by a brush 19 operated by hand or by a robot mechanism. It may also be done on the water surface by raising the cage frame 8. A preferred procedure is to bring the cage to the surface such that ⅓ of the barrier net is above the water surface and rotating the cage about aligned exterior bearings 10, shown in FIG. 3, while spraying away the algae, grass and detritus with an hydraulic jet.

Figure 3:
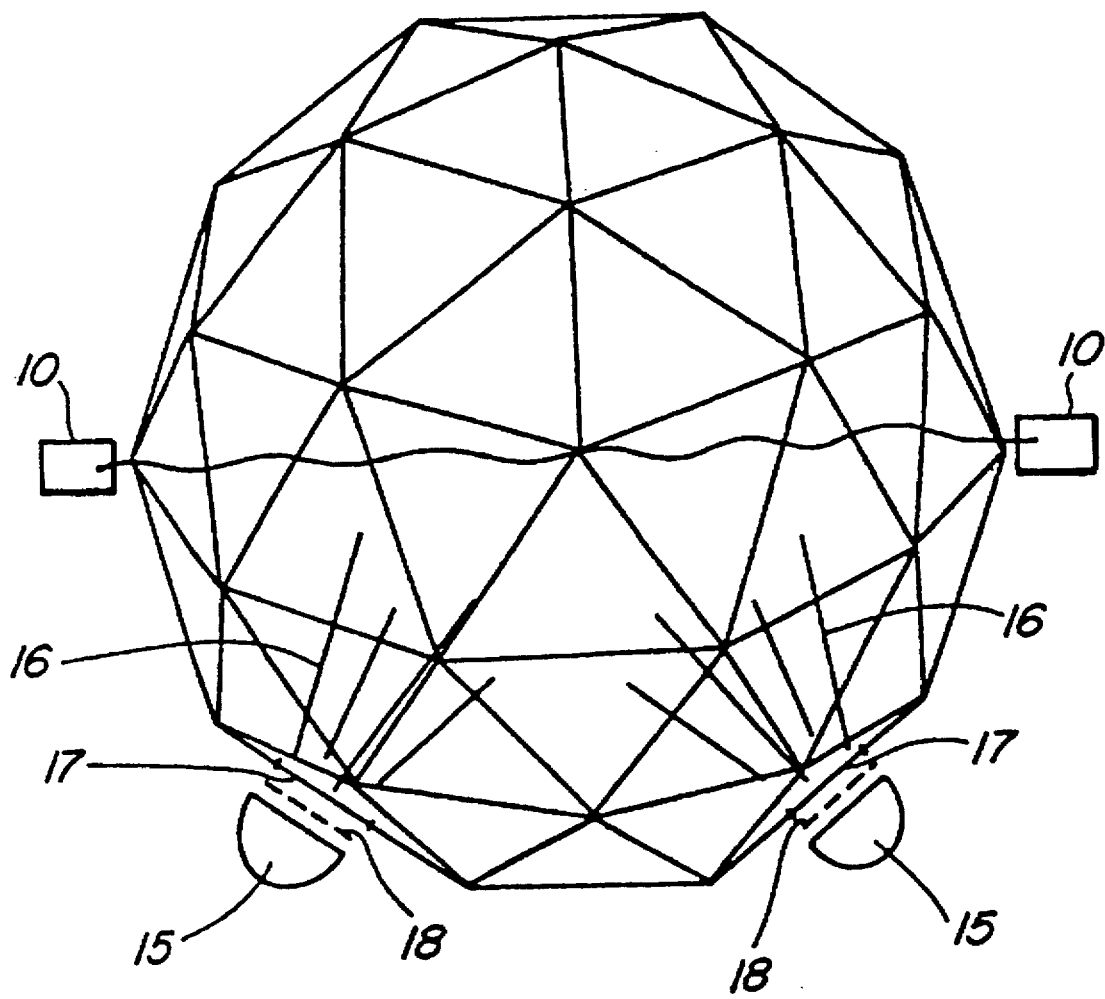
FIG. 3 is a face view of a polyhedron frame within which is mounted the barrier of FIG. 1.

In FIG. 3 a geodesic exo-skeletal frame contains a fine-meshed barrier net (not shown) the size of the openings of which are chosen according to the size of the fish larvae, predators and zooplankton. A preferred aperture width for cod larvae is 1.0 mm to 1.5 mm, more preferably about 1.1 mm. The shape of the interior barrier net 3 can be as simple as a tetrahedron, but preferably an icosahedron or near spherical shape is suitable in large embodiments.

Two light sources 15 are mounted exterior to the incubator, projecting their intersecting fields of illumination 16 through the cage 2 by means of a window 17. Filters 18 on the light sources 15 emphasize the yellow-green-blue portion of the spectrum in this field of illumination 16. The cage 2 is provided with rotational bearings 10 by which it may be rotationally repositioned when raised to the surface.

Figure 4:
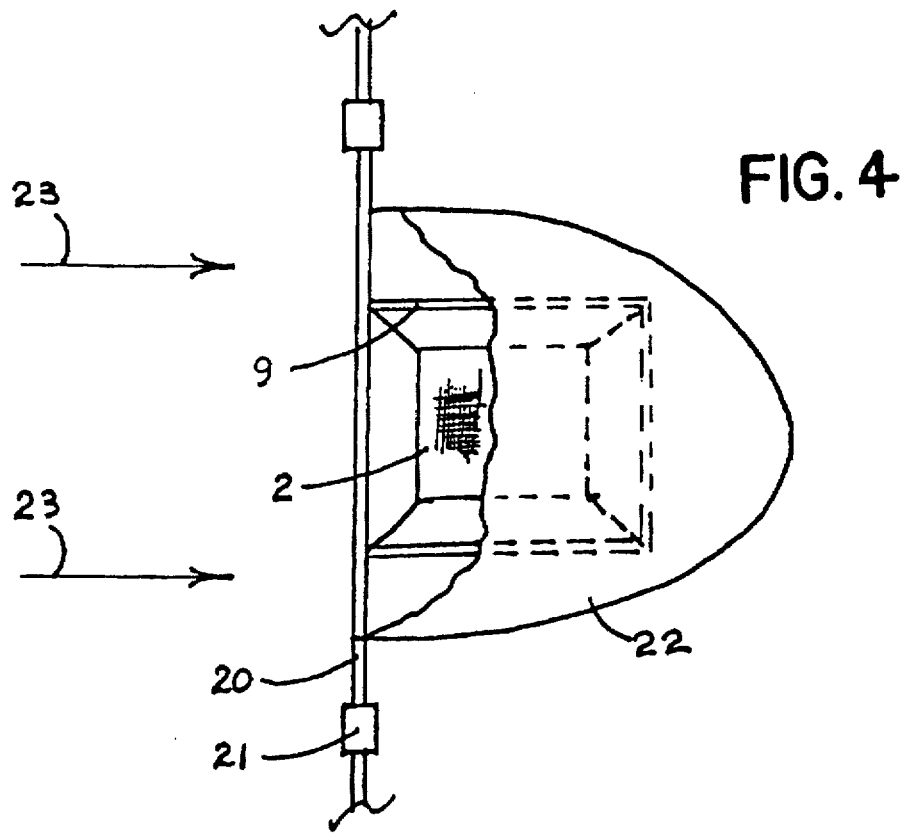
FIG. 4 is a side view of a cage with a downstream fairing.
Figure 6:
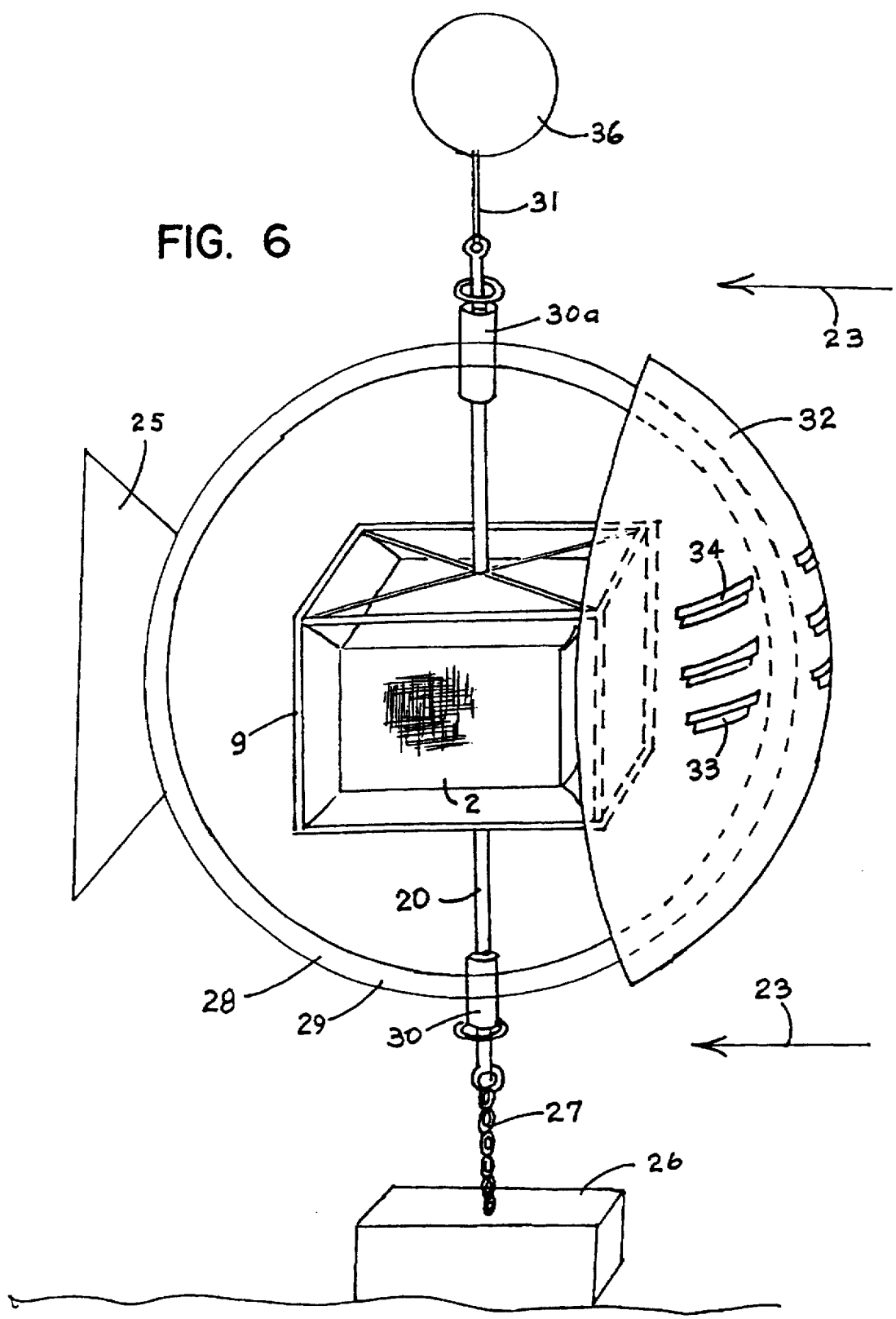
FIG. 6 is a partial perspective view of an alternate arrangement of support for the baffle and vane system of FIG. 5.

In FIG. 4 a fish cage 2 in a frame 6 is attached to a rotatable shaft 20 which is held in position in a column of water through bearings 21 by a support structure (not shown) such as mooring lines or that depicted in FIG. 6.

The frame 9 of the cage 2 is shown in FIG. 4 as being attached to the shaft 20 and therefore is free to rotate with the shaft 20. Also attached to the shaft 20 is a shroud or fairing 22, show as partially cut-away, which substantially envelopes the cage 2 on all but one side.

This fairing 22 is preferably conical or ellipsoidal in cross-section to provide stream lining. It is positioned to swing down-stream in the presence of a current 23. Its function is to deflect the greater part of the current 23 from penetrating the cage 2 so as to protect the fish fry and larval fish, contained within the cage 2. In this downstream mode, the fairing 22 creates a largely stagnant region upstream of its open end that deflects the current 23 before it reaches the cage 2. Streamlining is provided to reduce loads on the support system.

In a current, such as a tidal flow, the fairing 22 and cage 2 will tend to swing to present the open end of the fairing 22 towards the current 23. Thus the cage will be shielded from currents 23 arriving from varying directions.

Figure 5:
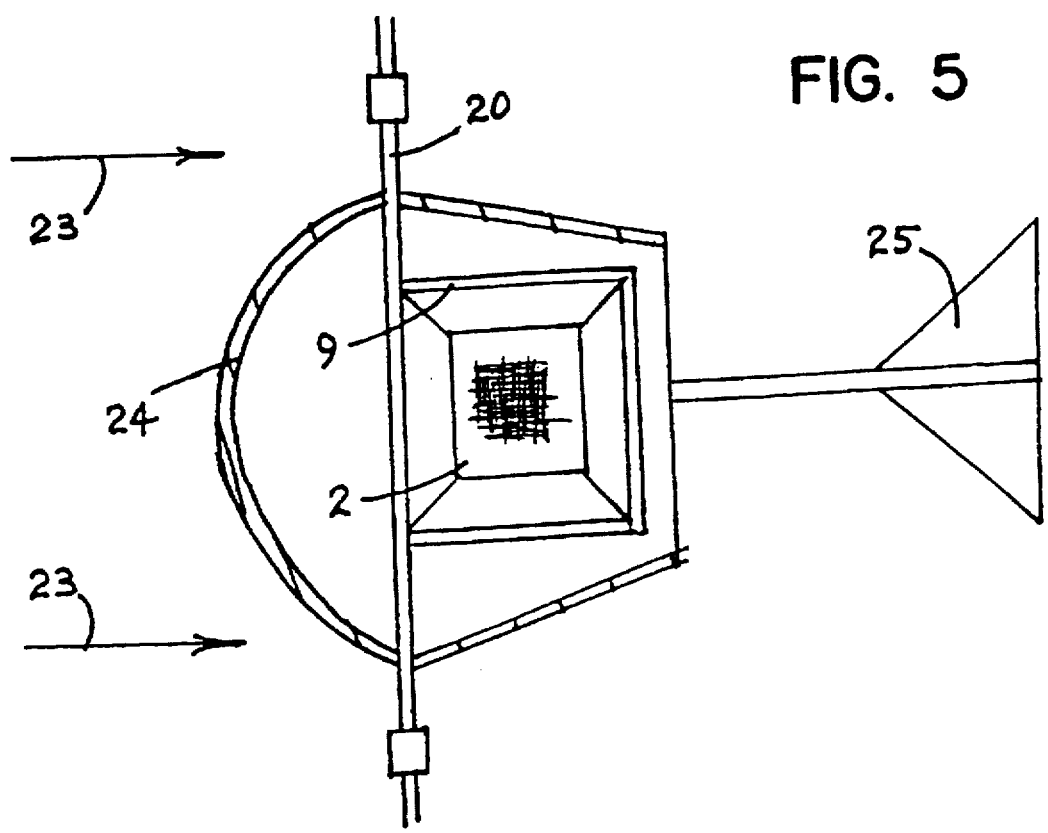
FIG. 5 is a side view of a cage with an upstream baffle and vane supported on a hinged shaft.

In FIG. 5 an upstream, pointed, bullet-shaped shroud 24 is fixed to the shaft 20 to rotate with it. This shroud 24, which is open-ended at its downstream end, also serves as a fairing, sheltering the cage 2 from the direct effect of the current 23 by providing a water "shadow" within which the cage is contained.

To direct the shroud 24 towards the current a trailing vane 25 attached to the shaft 20, shroud 24 or cage 2 may be provided.

In both the cases of FIGS. 4 and 5 the fairing 22 or shroud 24 may be relieved by openings (shown in the embodiment of FIG. 6) to allow some degree of flow of water through the cage 2.

In FIG. 6, another configuration for the upstream shroud arrangement of FIG. 5 is shown in conjunction with a mooring system. An anchor 26 restrains a chain or other link 27 which extends up to a rotating shroud frame 28 incorporating a hoop 29 of suitable material, such as tubular metal. Joints 30, 30a are provided at the bottom and top of the hoop 29, permitting rotation of the hoop 29 with respect to the chain 27 at the bottom, and a float line 31 at the top. The float line 31 leads to a float 36 that is located above the hoop 29, optionally at the surface.

One side of the loop 29 carries a vane 25 to function as in FIG. 5, the other side carries a shroud 32. Within the hoop 29 the cage 2 is suspended through joints 30, 30a, and connected to the chain 27. As the chain 27 is under tension due to the lift of the float 36, the cage 2 will resist a tendency to rotate. However, the shroud 32 will rotate in response to the pressure of the current 23 on the vane 25 orienting to provide a current "shadow" around the cage 2.

The surface of the shroud 32 may be provided with openings 33, and adjustable shutters 34 for such openings, to allow a controlled portion of the current 23 to pass towards the cage 2.

By means of these structures, the small fish fry and larval fish being cultivated will be located in a sheltered zone where zooplankton and other food fish may gather.

Although not shown in FIGS. 4 to 6, the cage 2 may be provided with illumination to attract zooplankton and a selected mesh size as described previously to exclude predators.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property is claimed as follows:

1. An anchored fish larvae or fry incubator for containing fish larvae or fry of a specific size, for placement in waters containing both live zooplankton and predators of said fish larvae or fry, said incubator comprising an enveloping barrier for enclosing said larvae or fry within an interior region of the incubator and a light source positioned proximate said incubator to provide light preferentially within said interior region and extending outwardly, the light source having a spectrum which is attractive to certain live zooplankton so as to preferentially attract said live zooplankton by virtue of their phototactic response to this light to enter into the interior region of the incubator, and the barrier having openings therein which are:

(1) smaller than said fish larvae or fry and said predators; and (2) larger than said live zooplankton, whereby the live zooplankton may selectively be drawn into the incubator to be consumed by the fish larvae or fry.

2. An incubator as in claim 1 wherein the openings are in the range of 1.0 to 1.5 millimeters in diameter.

3. An incubator as in claim 1 wherein the light source is in the yellow to blue range of the spectrum, producing light having a wavelength of between 0.67 microns and 0.45 microns.

4. An incubator as in claim 1 wherein said light source is provided from two or more locations to effect intersecting fields of illumination within the incubator.

5. An incubator as in claim 1 wherein said light source is positioned outside the enveloping barrier.

6. An incubator as in claim 1 in combination with cleaning means to effect removal of contaminants from the openings in said barrier.

7. An incubator as in claim 1 comprising mooring means for positioning said incubator at a submerged location in an aquatic environment, and raising said incubator to the surface for cleaning.

8. An incubator as in claim 1 in combination with a current deflecting barrier for shielding the incubator from the full force of water currents.

9. An incubator and barrier as in claim 8 wherein the barrier is a fairing that has a closed end and an open end, the barrier being coupled to a rotatable support shaft to permit it to rotate and self-align with water currents.

10. An incubator and barrier as in claim 9 further comprising a vane coupled to the support shaft and positioned to direct the closed end of the fairing towards a current when immersed in water.

11. An incubator and barrier as in claim 9 further comprising a vane coupled to the support shaft and positioned to align the fairing with a current when immersed in water and shelter the incubator from exposure to the full force of the current.

12. An incubator and barrier as in claim 11 wherein the incubator is fixed to resist rotation with the fairing.

13. An incubator and barrier as in claim 8 wherein the barrier is provided with openings to permit a partial flow of water therethrough.

14. An incubator and barrier as in claim 13 wherein the openings are adjustable.

15. A method of raising larval fish or fry through the passage into their juvenile stage comprising the steps of:

(1) containing larval fish or fry in a cage having a porous barrier with apertures that exclude predators, contain said larval fish or fry and admit entry of naturally occurring, live zooplankton, said cage being illuminated by a submerged source of light attractive to live zooplankton to induce entry of the live zooplankton into the cage to be consumed as food by the larval fish or fry;

(2) locating the cage in waters containing live zooplankton;

(3) gradually providing the larval fish or fry with increasing quantities of nonliving solid food while continuing to provide such larval fish or fry with access to live naturally occurring zooplankton as additive food until the larval fish or fry have been weaned from an exclusive diet of live zooplankton to a diet of solid nonliving foods.

16. A fish larvae or fry incubator in combination with a current deflecting barrier for sheltering said incubator from currents, said incubator for containing fish larvae or fry being positionable in waters containing both live zooplankton and predators of said fish larvae or fry, said incubator comprising an enveloping, fish-enclosing barrier for enclosing fish larvae or fry within an interior region of the incubator and a light source positioned proximate said incubator to provide light within said interior region and extending outward, the light source having a spectrum which is attractive to live zooplankton so as to preferentially attract said live zooplankton to enter into the interior region of the incubator and thereby to be consumed by the larval fish or fry, and the fish-enclosing barrier having openings therein which are:

(1) smaller than said fish larvae or fry and said predators; and (2) larger than said zooplankton, whereby the zooplankton may selectively be drawn into the incubator by said submerged light source, to be consumed by the fish larvae or fry, and said incubator and current deflecting barrier being re-orientable in response to water currents to shelter said incubator and its contents from direct exposure to the full force of said currents.

17. An incubator and current deflecting barrier combination as in claim 16 wherein said current deflecting barrier is positioned within said current in advance of said incubator.

18. An incubator and current deflecting barrier combination as in claim 17 comprising vane means coupled to said current deflecting barrier to urge said current deflecting barrier into alignment with said current whereby said incubator will be sheltered from direct exposure to the full force of said currents.

19. An incubator and current deflecting barrier combination as in claim 16 wherein said current deflecting barrier is positioned within said current downstream from said incubator.

20. An incubator as in claim 16 wherein said incubator is fixed to resist rotation with the current deflecting barrier.

* * * * *